US011955047B2

(12) United States Patent
Meng

(10) Patent No.: US 11,955,047 B2
(45) Date of Patent: Apr. 9, 2024

(54) DISPLAY PANEL AND DRIVING METHOD THEREOF, COMPENSATION DATA COMPRESSION METHOD AND DECOMPRESSION METHOD

(71) Applicants: Hefei BOE Joint Technology Co., Ltd., Hefei (CN); BOE TECHNOLOGY GROUP CO., LTD., Beijing (CN)

(72) Inventor: Song Meng, Beijing (CN)

(73) Assignees: Hefei BOE Joint Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 24 days.

(21) Appl. No.: 17/628,876

(22) PCT Filed: Jan. 22, 2021

(86) PCT No.: PCT/CN2021/073402
§ 371 (c)(1),
(2) Date: Jan. 20, 2022

(87) PCT Pub. No.: WO2022/155921
PCT Pub. Date: Jul. 28, 2022

(65) Prior Publication Data

US 2023/0162642 A1 May 25, 2023

(51) Int. Cl.
*G09G 3/20* (2006.01)
*G09G 3/3275* (2016.01)

(52) U.S. Cl.
CPC ......... *G09G 3/2007* (2013.01); *G09G 3/3275* (2013.01); *G09G 2300/0819* (2013.01);
(Continued)

(58) Field of Classification Search
CPC .... G09G 5/39; G09G 3/3611; G09G 2360/18; G09G 5/42; G09G 5/399; H04N 19/423; H04N 19/593
See application file for complete search history.

(56) References Cited

U.S. PATENT DOCUMENTS

2008/0225053 A1* 9/2008 Obinata .................. G09G 5/39 375/E7.266
2015/0348463 A1* 12/2015 Lee ...................... G09G 3/3233 345/212
2016/0171939 A1* 6/2016 Na ....................... G09G 3/3607 345/88

* cited by examiner

*Primary Examiner* — Shaheda A Abdin
(74) *Attorney, Agent, or Firm* — Perilla Knox & Hildebrandt LLP; Kenneth A. Knox

(57) ABSTRACT

The present disclosure relates to the field of display technology, and provides a display panel and a driving method thereof, a compensation data compression method and a compensation data decompression method. The display panel includes a data compression unit and a data decompression unit. The data compression unit is used to acquire a plurality of first compensation data and a common parameter, and compress each of the first compensation data into second compensation data according to a preset compression rule based on the first compensation data and the common parameter. The data decompression unit is used to acquire a plurality of second compensation data and the common parameter, and decompress each of the second compensation data into the first compensation data according to a preset decompression rule based on the second compensation data and the common parameter.

17 Claims, 3 Drawing Sheets

(52) U.S. Cl.
CPC ... *G09G 2340/02* (2013.01); *G09G 2360/128* (2013.01); *G09G 2360/145* (2013.01)

DISPLAY PANEL AND DRIVING METHOD THEREOF, COMPENSATION DATA COMPRESSION METHOD AND DECOMPRESSION METHOD

CROSS REFERENCE TO RELATED APPLICATION

The present disclosure is a 35 U.S.C. § 371 national phase application of International Application No. PCT/CN2021/073402 filed on Jan. 22, 2021, the entire contents of which being incorporated by reference in their entirety herein.

TECHNICAL FIELD

The present disclosure relates to the field of display technology and, in particular, to a display panel and a driving method thereof, a compensation data compression method, and a compensation data decompression method.

BACKGROUND

A display panel needs to store and transmit a large amount of compensation data to improve the display effect. However, the large amount of compensation data will increase the manufacturing cost and the driving cost of the display panel.

It should be noted that the information disclosed in the above Background section is only for enhancement of understanding of the background of the present disclosure, and therefore may contain information that does not form the prior art that is already known to a person of ordinary skill in the art.

SUMMARY

According to an aspect of the present disclosure, there is provided a display panel. The display panel includes a data compression unit and a data decompression unit. The data compression unit is configured to acquire a plurality of first compensation data and a common parameter, and to compress each of the first compensation data into second compensation data according to a preset compression rule based on the first compensation data and the common parameter. The bit width of the second compensation data is smaller than the bit width of the respective first compensation data. The difference between each of the first compensation data and the respective second compensation data is equal to the common parameter. The data decompression unit is configured to acquire a plurality of the second compensation data and the common parameter, and decompress each of the second compensation data into the first compensation data according to a preset decompression rule based on the second compensation data and the common parameter.

In an exemplary embodiment of the present disclosure, each of the first compensation data has the same bit width, and each of the second compensation data has the same bit width.

In an exemplary embodiment of the present disclosure, the compression rule includes acquiring the difference between the first compensation data and the common parameter to obtain the second compensation data.

In an exemplary embodiment of the present disclosure, the preset decompression rule includes acquiring the sum value of the second compensation data and the common parameter to obtain the first compensation data.

In an exemplary embodiment of the present disclosure, the display panel includes a driving transistor, and the first compensation data includes any one of threshold compensation data and mobility compensation data of the driving transistor.

In an exemplary embodiment of the present disclosure, the first compensation data is the mobility compensation data.

In an exemplary embodiment of the present disclosure, the common parameter is acquired by a preset detection method. The preset detection method includes: writing, in a non-compensation state of the display panel, different input grayscales to the preset area of the display panel in a time division way; detecting the brightness of the preset area to obtain a plurality of input grayscales corresponding to different brightness; acquiring the output grayscale corresponding to each of the input grayscales in the non-compensation state, according to the plurality of input grayscales corresponding to different brightness; acquiring a plurality of target input grayscales corresponding to different brightness; acquiring target compensation data according to a plurality of the target input grayscales and a plurality of output grayscales; and subtracting a preset value from the target compensation data to obtain the common parameter.

In an exemplary embodiment of the present disclosure, the preset area is located in a central area of the display panel.

In an exemplary embodiment of the present disclosure, the output grayscale $GL_{out}=a(GL_{in}/GL_{max})^{x}+b$, where $GL_{in}$ is the input grayscale, a is the mobility compensation data, b is the threshold compensation data, and X is the Gamma value correlated quantity, $GL_{max}$ is the maximum gray scale of the display panel. The acquiring the plurality of input grayscales corresponding to different brightness, includes acquiring a first input grayscale corresponding to a first brightness value and a second input grayscale corresponding to a second brightness value. The acquiring of the plurality of target input grayscales corresponding to different brightness, includes acquiring a first target input grayscale corresponding to a first brightness value and a second target input grayscale corresponding to a second brightness value.

In an exemplary embodiment of the present disclosure, the acquiring the output grayscale corresponding to each of the input grayscales in non-compensation state according to the plurality of input grayscales corresponding to different brightness, includes: acquiring a first output grayscale corresponding to the first input grayscale and a second output grayscale corresponding to the second input grayscale, according to the formula of $GL_{out}=a(GL_{in}/GL_{max})^{x}+b$, where b=0, and a has a value equal to the maximum grayscale value of the display panel.

In an exemplary embodiment of the present disclosure, the first brightness value is zero, and the second brightness value is the maximum brightness of the display panel. The acquiring the first input grayscale corresponding to the first brightness value and the second input grayscale corresponding to the second brightness value, includes: gradually increasing the input grayscale according to a preset interval; acquiring the input grayscale, when the brightness of the display panel changes from zero to non-zero, as the first input grayscale; and acquiring the input grayscale, when the brightness of the display panel is the maximum brightness, as the second input grayscale.

In an exemplary embodiment of the present disclosure, the first target input grayscale corresponding to the first brightness value is 0, and the second target grayscale corresponding to the second brightness value is the maximum grayscale of the display panel.

In an exemplary embodiment of the present disclosure, the acquiring the target compensation data according to the plurality of the target input grayscales and the plurality of output grayscales, includes: calculating the target compensation data a1 according to the formula of $a1=(GL1-GL2)\,GL_{max}^{x}/(GL_{ob1}^{x}-GL_{ob2}^{x})$, where GL1 is the first output grayscale, GL2 is the second output grayscale, $GL_{max}$ is the maximum grayscale of the display panel, $GL_{ob1}$ is the first target input grayscale, and $GL_{ob2}$ is the second target input grayscale.

In an exemplary embodiment of the present disclosure, the bit width of the first compensation data is 10 bits, the bit width of the second compensation data is 9 bits, and the preset value is in a range of 128-256.

In an exemplary embodiment of the present disclosure, the display panel further includes: a source driving circuit, a first storage unit, a second storage unit, and a third storage unit. The source driving circuit is connected to the data compression unit, for providing a plurality of the first compensation data. The first storage unit is connected to the data compression unit, for storing the common parameter. The second storage unit is connected to the data compression unit, for storing the second compensation data when powered off and powered on. The third storage unit is connected to the data compression unit and the data decompression unit, for storing the second compensation data when powered on.

In an exemplary embodiment of the present disclosure, the first storage unit includes an electrically erasable programmable read-only memory EEPROM; the second storage unit includes a flash memory; and the third storage unit includes a double rate synchronous dynamic random access memory DDR.

According to an aspect of the present disclosure, there is provided a display panel driving method, for driving the above-mentioned display panel. The driving method includes: using the data compression unit to acquire a plurality of first compensation data provided by the source driving circuit and the common parameter stored in the first storage unit, and to generate a plurality of second compression data based on the plurality of first compensation data and the common parameter; and using the third storage unit to store the second compression data; and using the data decompression unit to acquire the second compensation data in the third storage unit, so as to compensate the output grayscale in real time.

In an exemplary embodiment of the present disclosure, the driving method further includes storing a plurality of the second compensation data into a second storage unit, and, in response to the display panel being powered on, storing, into the third storage unit, the plurality of the second compensation data stored in the second storage unit.

According to an aspect of the present disclosure, a compensation data compression method for a display panel is provided. The compensation data compression method for a display panel includes: acquiring a common parameter and a plurality of first compensation data; and calculating the difference between each of the first compensation data and the common parameter to obtain second compensation data, wherein the bit width of the second compensation data is smaller than the bit width of the first compensation data.

In an exemplary embodiment of the present disclosure, each of the first compensation data has the same bit width, and each of the second compensation data has the same bit width.

In an exemplary embodiment of the present disclosure, the display panel includes a driving transistor, and the first compensation data includes any one of threshold compensation data and mobility compensation data of the driving transistor.

In an exemplary embodiment of the present disclosure, the first compensation data includes the mobility compensation data.

In an exemplary embodiment of the present disclosure, the common parameter is acquired by a preset detection method. The preset detection method includes: writing, in a non-compensation state of the display panel, different input grayscales to a preset area of the display panel in a time division way; detecting the brightness of the preset area to obtain a plurality of input grayscales corresponding to different brightness; acquiring the output grayscale corresponding to each of the input grayscales in the non-compensation state, according to the plurality of input grayscales corresponding to different brightness; acquiring a plurality of target input grayscales corresponding to different brightness; acquiring target compensation data according to the plurality of the target input grayscales and a plurality of output grayscales; and subtracting a preset value from the target compensation data to obtain the common parameter.

In an exemplary embodiment of the present disclosure, the preset area is located in a central area of the display panel.

In an exemplary embodiment of the present disclosure, the output grayscale $GL_{out}=a(GL_{in}/GL_{max})^{x}+b$, where $GL_{in}$ is the input grayscale, a is the mobility compensation data, b is the threshold compensation data, and X is the Gamma value correlated quantity, $GL_{max}$ is the maximum grayscale of the display panel. The acquiring the plurality of input grayscales corresponding to different brightness, includes acquiring a first input grayscale corresponding to a first brightness value and a second input grayscale corresponding to a second brightness value. The acquiring of the plurality of target input grayscales corresponding to different brightness includes acquiring a first target input grayscale corresponding to the first brightness value and a second target input grayscale corresponding to the second brightness value.

In an exemplary embodiment of the present disclosure, the acquiring of the output grayscale corresponding to each of the input grayscales in non-compensation state according to the plurality of input grayscales corresponding to different brightness, includes: acquiring a first output grayscale corresponding to the first input grayscale and a second output grayscale corresponding to the second input grayscale, according to the formula of $GL_{out}=a(GL_{in}/GL_{max})^{x}+b$, where b=0, and the value of a is equal to the maximum grayscale value of the display panel.

In an exemplary embodiment of the present disclosure, the first brightness value is zero, and the second brightness value is the maximum brightness of the display panel. The acquiring the first input grayscale corresponding to the first brightness value and the second input grayscale corresponding to the second brightness value, includes: gradually increasing the input grayscale according to a preset interval; acquiring the input grayscale, when the brightness of the display panel changes from zero to non-zero, as the first input grayscale; and acquiring the input grayscale, when the brightness of the display panel is the maximum brightness, as the second input grayscale.

In an exemplary embodiment of the present disclosure, the first target input grayscale corresponding to the first brightness value is 0, and the second target grayscale corresponding to the second brightness value is the maximum grayscale of the display panel.

In an exemplary embodiment of the present disclosure, the acquiring the target compensation data according to the plurality of the target input grayscales and the plurality of output grayscales, includes: calculating the target compensation data a1 according to the formula of $a1=(GL1-GL2)GL_{max}^{x}/(GL_{ob1}^{x}-GL_{ob2}^{x})$, where GL1 is the first output grayscale, GL2 is the second output grayscale, $GL_{max}$ is the maximum grayscale of the display panel, $GL_{ob1}$ is the first target input grayscale, and $GL_{ob2}$ is the second target input grayscale.

In an exemplary embodiment of the present disclosure, the bit width of the first compensation data is 10 bits, the bit width of the second compensation data is 9 bits, and the preset value is in a range of 128-256.

According to an aspect of the present disclosure, there is provided a compensation data decompression method for a display panel, configured to decompress the second compensation data compressed by the compensation data compression method for a display panel. The decompression method includes acquiring a common parameter and a plurality of second compensation data, and calculating a sum value of each of the second compensation data and the common parameter to obtain first compensation data, wherein the bit width of the second compensation data is smaller than the bit width of the first compensation data.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the present specification, illustrate embodiments consistent with the present disclosure and together with the description serve to explain the principles of the present disclosure. Understandably, the drawings in the following description are only some embodiments of the present disclosure, and for those of ordinary skill in the art, other drawings can also be obtained from these drawings without creative efforts.

DETAILED DESCRIPTION

Figure 1:
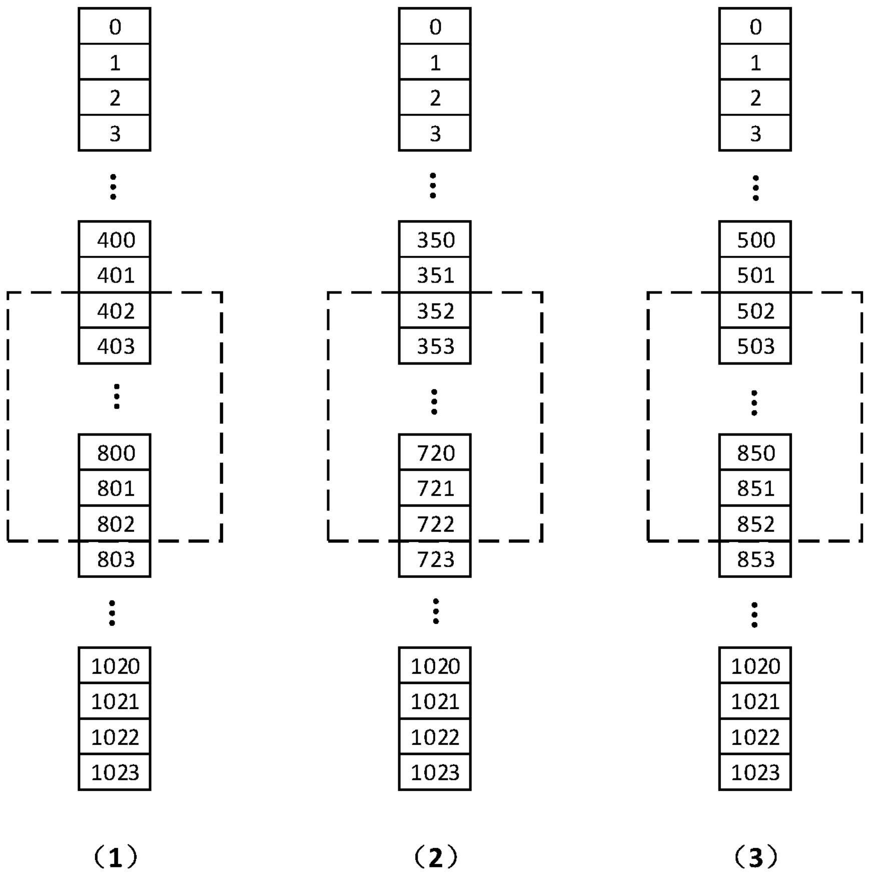
FIG. 1 is a diagram showing a value range of mobility compensation data a in three different display panels in the related art.

Example embodiments will now be described more fully with reference to the accompanying drawings. Example embodiments, however, may be embodied in various forms and should not be construed as limited to the examples set forth herein. Rather, these embodiments are provided so that the present disclosure will be thorough and complete, and will fully convey the concept of example embodiments to those skilled in the art. The same reference numerals in the drawings denote the same or similar structures, and thus their detailed descriptions will be omitted.

Although relative terms such as "upper" and "lower" are used in the present specification to describe the relative relationship of one component represented by an icon to another component represented by an icon, these terms are used in the present specification only for convenience, such as based on the direction in the example illustrated in the drawings. It will be appreciated that if a device represented by an icon is turned upside down, the component described as being "above" the device will become the component being "under" the device. Other relative terms, such as "high", "low", "top", "bottom", "left", and "right", are also used to have similar meanings. When a certain structure is "on" another structure, it may mean that the structure is integrally formed on the other structure, or that the structure is "directly" arranged on the other structure, or that the structure is "indirectly" arranged on the other structure through an intermediate structure.

The terms "a", "an", and "the" are used to indicate the presence of one or more elements or components, etc. The terms "including" and "having" are used to indicate an open-ended inclusion and mean that additional elements or components, etc. may be present in addition to the listed elements or components, etc.

As noted above, a display panel needs to store and transmit a large amount of compensation data to improve the display effect. For example, in an organic light-emitting diode (OLED) display panel, a pixel driving circuit of the display panel generally includes a driving transistor, and the driving transistor may provide a driving current to the light-emitting unit according to a data signal at the gate thereof. However, due to manufacturing process problems, different driving transistors may have different thresholds and mobilities. Thus, the display panel needs to use threshold compensation data and mobility compensation data to compensate the threshold and mobility of each driving transistor respectively, so as to improve the display uniformity of the display panel.

In the related art, the display panel may compensate the threshold and mobility of the driving transistor according to the formula of $GL_{out}=a(GL_{in}/GL_{max})^{x}+b$. In the formula, $GL_{in}$ is the input grayscale, a is the mobility compensation data, b is the threshold compensation data, X is the gamma value correlated quantity, and $GL_{max}$ is the maximum grayscale of the display panel. The gamma value correlated quantity X is a fixed value after the gamma value of the display panel is determined. As shown in FIG. 1, a diagram is illustrated showing a value range of the mobility compensation data a in three different display panels in the related art. As shown in FIGS. 1, (1), (2), and (3) respectively represent the mobility compensation data a corresponding to three display panels under the same design specification, and the display panels are 10-bit display panels. In the drawings, the part enclosed by the dotted box is the value range for the mobility compensation data a in the respective display panel. It can be seen from FIG. 1 that the value range for the mobility compensation data a in the display panel (1) is 402-802, the value range for the mobility compensation data a in the display panel (2) is 352-722, and the value range for the mobility compensation data a in the display panel (3) is 502-852. According to statistics over a large number of display panels under such design specification, it may be concluded that, in the display panel under such design specification, the overall value range for the mobility compensation data a is between 300 and 900. Therefore, the display panel under such design specification needs to indicate the mobility compensation data a by a data with a bit width of 10 bits.

The related art proposes a data compression method. For each display panel, a parameter is subtracted from the mobility compensation data a in the display panel, and the parameter may be the minimum value of the mobility compensation data a in the display panel. For example, the mobility compensation data a in the display panel (1) may be subtracted by 402, the mobility compensation data a in the display panel (2) may be subtracted by 352, and the mobility compensation data a in the display panel (3) may be subtracted by 502. According to a large number of statistics, it may be concluded that the mobility compensation data a after the above difference processing may be less than 512. Therefore, the mobility compensation data a after the difference processing may be represented by a data with a bit width of 9 bits. However, different display panels have different parameters and thus, data analysis needs to be performed on each display panel to obtain the respective parameters. Accordingly, different data compression programs also need to be set for each display panel to match different parameters. Therefore, if the display panel adopts the above-mentioned compression method, it will cause various technical problems, such as that the display panel has a large workload and is difficult for mass-produce.

Figure 2:
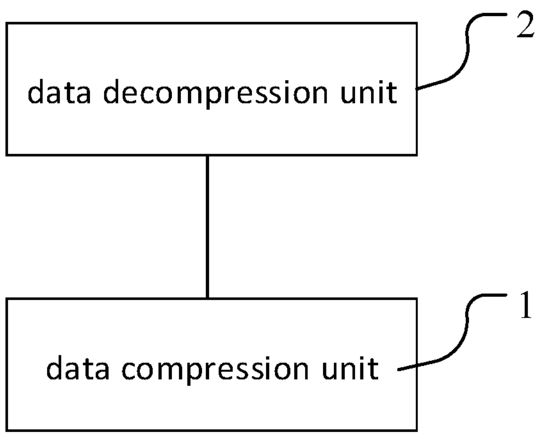
FIG. 2 is a schematic structural diagram of a display panel according to an exemplary embodiment of the present disclosure.

In view of above, an exemplary embodiment of the present disclosure provides a display panel, as shown in FIG. 2, which is a schematic structural diagram of the display panel according to an exemplary embodiment of the present disclosure. The display panel may include a data compression unit 1 and a data decompression unit 2. The data compression unit 1 may be used to acquire a plurality of first compensation data and a common parameter, and to compress each of the first compensation data into second compensation data according to a preset compression rule based on the first compensation data and the common parameter. The bit width of the second compensation data is smaller than the bit width of the respective first compensation data. The difference between each of the first compensation data and the respective second compensation data is equal to the common parameter. The data decompression unit 2 is configured to acquire a plurality of the second compensation data and the common parameter, and to decompress each of the second compensation data according to a preset decompression rules into the first compensation data based on the second compensation data and the common parameter. The second compensation data compressed by the first compensation data corresponds to the first compensation data. Similarly, the first compensation data decompressed by the second compensation data corresponds to the second compensation data.

In the display panel provided by an exemplary embodiment of the present disclosure, the difference between each of the first compensation data and the respective second compensation data is equal to the common parameter. That is, when compressing any of the first compensation data, the compression unit may subtract the common parameter from the first compensation data to obtain the second compensation data. On one hand, in the mass production of the display panel, the data compression method for different display panels may use the same common parameter, and the display panel may obtain the common parameter without data analysis. Thus, the large workload of the display panel in the related art may be avoided. On the other hand, the display panel may implement the above-mentioned data compression unit and data decompression unit simply by hardware, and does not need to implement the above-mentioned compression and decompression method through a programmable circuit, thereby reducing the cost of the display panel.

In an exemplary embodiment, the first compensation data may be mobility compensation data. It should be understood that, in other exemplary embodiments, the first compensation data may also be other compensation data. For example, the first compensation data may be threshold compensation data or the like.

In an exemplary embodiment, the bit width of each of the first compensation data may be equal, and the bit width of each of the second compensation data may be equal. For example, the bit width of the first compensation data may be 10 bits, and the bit width of the second compensation data may be 9 bits. Since the bit width of the second compensation data is the same, during data reading, the data may be read according to the same data step size. For example, the second compensation data may be read according to the data step size of every 9 bits. This data reading method is relatively simple. Therefore, the setting of the equal bit width of the second compensation data helps to facilitate reading the second compensation data by using a relatively simple data reading method. Similarly, the setting of the equal bit width of the first compensation data also helps to facilitate reading the first compensation data by using the above-mentioned data reading method with the equal data step size. It should be understood that, in other exemplary embodiments, the bit width of the first compensation data may also be different, and the bit width of the second compensation data may also be different. Accordingly, in the process of reading the first compensation data and the second compensation data, different data step sizes are needed when reading data of different bit widths.

In an exemplary embodiment, the compression rule may include acquiring the difference between the first compensation data and the common parameter to obtain the second compensation data. Thus, the value of the second compensation data may be equal to the value of the first compensation data minus the common parameter. In an exemplary embodiment, after the difference between the first compensation data and the common parameter is acquired, the bit width of the difference needs to be converted. The acquisition of the difference and the conversion of the bit width may be accomplished simultaneously through a single execution action, or may be done separately by two execution actions. The preset decompression rule may include acquiring the sum value of the second compensation data and the common parameter to obtain the first compensation data. Similarly, after acquiring the sum value of the second compensation data and the common parameter, it is also necessary to convert the bit width of the sum value. The acquisition of the sum value and the conversion of the bit width may be accomplished simultaneously through a single execution action. Alternatively, they may also be done separately by two execution actions.

In an exemplary embodiment, the common parameter is acquired by a preset detection method, and the preset detection method may include the following steps S1-S6.

In step S1, in a non-compensation state of the display panel, different input grayscales are written into a preset area of the display panel in a time division way.

In step S2, the brightness of the preset area is detected to obtain a plurality of input grayscales corresponding to different brightness.

In step S3, the output grayscale corresponding to each of the input grayscales in the non-compensation state is acquired according to the plurality of input grayscales corresponding to different brightness.

In step S4, a plurality of target input grayscales corresponding to different brightness is acquired.

In step S5, target compensation data is acquired according to a plurality of the target input grayscales and a plurality of output grayscales.

In step S6, a preset value is subtracted from the target compensation data to obtain the common parameter.

The above steps are described in detail below.

In an exemplary embodiment, the output grayscale $GL_{out}$ may be equal to $a(GL_{in}/GL_{max})^x+b$, where $GL_{in}$ is the input grayscale, a is the mobility compensation data, b is the threshold compensation data, and X is the gamma value correlated quantity. When the gamma value of the display panel is constant, the gamma value correlated quantity X is a fixed value. $GL_{max}$ is the maximum grayscale of the display panel. For example, in an 8 bit display panel, $GL_{max}$ is 255, and in a 10 bit display panel, $GL_{max}$ is 1023.

In step S1, the detected display panel may be any display panel under a certain design specification, and the common parameter detected by the display panel may be applied to any display panel under the same design specification. The detection method may only detect the brightness of a partial area of the display panel, thereby reducing the power consumption of the display panel during the detection process. Under the same grayscale driving, the brightness of the central area of the display panel is close to the average brightness of the display panel, so the preset area may be located in the central area of the display panel. It should be understood that, in other exemplary embodiments, the preset area may also be located at other positions. In addition, the preset area may also be the entire display area of the display panel.

In step S2, acquisition of the plurality of input grayscales corresponding to different brightness may include the following operations.

The first input grayscale corresponding to the first brightness value and the second input grayscale corresponding to the second brightness value are acquired. The first brightness value and the second brightness value may be any brightness value. The specific method for acquiring the first input grayscale corresponding to the first brightness value may include, in a non-compensation state of the display panel, inputting the first input grayscale to the display panel, and detecting the brightness of the display panel as the first brightness value by using a brightness meter. In addition, the specific method for acquiring the first input grayscale corresponding to the first brightness value may also include: detecting the brightness of the display panel in any grayscale display state as the first brightness value, and acquiring the input grayscale in the grayscale display state as the first input grayscale. The method for acquiring the second input grayscale corresponding to the second brightness value may be the same as the method for acquiring the first input grayscale corresponding to the first brightness value.

In step S3, acquisition of the output grayscale corresponding to each of the input grayscales in the non-compensation state according to the plurality of input grayscales corresponding to different brightness may include the following operations.

According to the formula of $GL_{out}=a(GL_{in}/GL_{max})^x+b$, the first output grayscale corresponding to the first input grayscale, and the second output grayscale corresponding to the second input grayscale are acquired, where b=0, and the value of a is equal to the maximum grayscale value of the display panel. For example, in a 10 bit display panel, a=1023, and $GL_{max}=1023$. The first output grayscale $GL1=1023\ (GL_{in1}/1023)^x$, where $GL_{in1}$ is the first input grayscale. The second output grayscale $GL2=1023\ (GL_{in2}/1023)^x$, where $GL_{in2}$ is the second input grayscale.

In step S4, acquisition of the plurality of target input grayscales corresponding to different brightness may include the following operations.

A first target input grayscale corresponding to the first brightness value and a second target input grayscale corresponding to the second brightness value are acquired. In an exemplary embodiment, the brightness value corresponding to the target input grayscale has been determined in the design specification of the display panel. For example, when the input grayscale is 0, the brightness value is 0 nits, and when the input grayscale is the maximum grayscale, the brightness is the maximum brightness. Display panels of the same design specification have the same maximum brightness. In step S4, the first target input grayscale corresponding to the first brightness value and the second target input grayscale corresponding to the second brightness value may be acquired directly according to the design specification of the display panel.

In step S5, acquisition of the target compensation data according to the plurality of the target input grayscales and the plurality of output grayscales may include the following operations.

The target compensation data a1 is calculated according to the formula of $a1=(GL1-GL2)GL_{max}^x/(GL_{ob1}^x-GL_{ob2}^x)$, where GL1 is the first output grayscale, GL2 is the second output grayscale, $GL_{max}$ is the maximum grayscale of the display panel, $GL_{ob1}$ is the first target input grayscale, and $GL_{ob2}$ is the second target input grayscale.

In step S6, a preset value is subtracted from the target compensation data to obtain the common parameter. When the bit width of the first compensation data is 10 bits and the bit width of the second compensation data is 9 bits, the preset value may be in a range of 128-256. For example, the preset value may be 128, 150, 200, 250, or 256.

In an exemplary embodiment, the first brightness value may be zero, and the second brightness value may be the maximum brightness of the display panel. Acquisition of the first input grayscale corresponding to the first brightness value and the second input grayscale corresponding to the second brightness value may include: gradually increasing the input grayscale according to a preset interval; acquiring the input grayscale, when the brightness of the display panel changes from zero to non-zero, as the first input grayscale; and acquiring the input grayscale, when the brightness of the display panel is the maximum brightness, as the second input grayscale.

Accordingly, the first target input grayscale corresponding to the first brightness value is 0, and the second target grayscale corresponding to the second brightness value is the maximum grayscale of the display panel. That is, the target compensation data a1=GL2−GL1.

It should be understood that, in other exemplary embodiments, there may also be other functional relationships between the output grayscale $GL_{out}$ and the input grayscale $GL_{in}$. Accordingly, the target compensation data a1 may also be obtained by other acquisition methods. For example, when the functional relationship between the output grayscale $GL_{out}$ and the input grayscale $GL_{in}$ includes three types of compensation data, that is, a third compensation data other than the mobility compensation data a and the threshold compensation data b is included, three groups of brightness values and their respective target input grayscales and output grayscales may also be detected when the target compensation data a1 is acquired.

Figure 3:
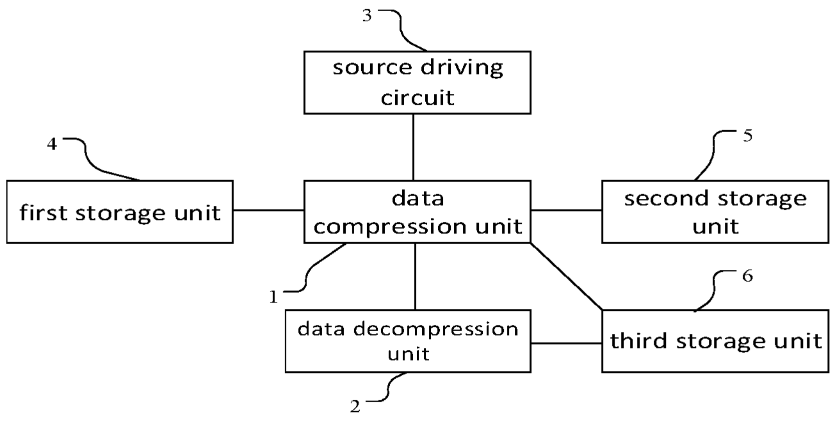
FIG. 3 is a schematic structural diagram of a display panel according to another exemplary embodiment of the present disclosure.

In an exemplary embodiment, as shown in FIG. 3, which is a schematic structural diagram of the display panel according to another exemplary embodiment of the present disclosure, the display panel further includes: a source driving circuit 3, a first storage unit 4, a second storage unit 5, and a third storage unit 6. The source driving circuit 3 may be connected with the data compression unit 1 to provide a plurality of the first compensation data. The first storage unit 4 may be connected with the data compression unit 1 to store the common parameter. The second storage unit 5 may be connected to the data compression unit 1 to store the second compensation data when powered off and powered on. The third storage unit 6 may be connected to the data compression unit 1 and the data decompression unit 2 to store the second compensation data when powered on.

In an exemplary embodiment, the first storage unit may include an electrically erasable programmable read-only memory EEPROM; the second storage unit may include a flash memory; and the third storage unit may include a double-rate synchronous dynamic random access memory DDR.

In an exemplary embodiment, the display panel may use the data compression unit 1 to acquire a plurality of first compensation data provided by the source driving circuit and the common parameter stored by the first storage unit, and to generate a plurality of second compression data based on the plurality of first compensation data and the common parameter. The display panel may also use the third storage unit 6 to store the second compression data. When the display panel is driven, the data decompression unit may be used to acquire the second compensation data in the third storage unit, so as to compensate the output grayscale in real time. Since the third storage unit cannot store data after the display panel is powered off, the display panel may also store a plurality of the second compensation data in the second storage unit, and the second storage unit may store the second compression data when the display panel is powered off. When the display panel is powered on, the display panel may store, into the third storage unit, a plurality of the second compensation data stored in the second storage unit. Thus, the data decompression unit may be used to acquire the second compensation data in the third storage unit, so as to compensate the output grayscale in real time. It should be noted that during the driving process of the display panel, the mobility of the driving transistor will change, and the display panel may detect the mobility of the driving transistor according to a preset period, so that the value of the first compensation data will also change accordingly according to the preset period. When the first compensation data changes, the data compression unit 1 may obtain new first compensation data through the source driving circuit, so as to realize the above driving process.

An exemplary embodiment of the present disclosure also provides a display panel driving method for driving the above-mentioned display panel. The driving method may include: using the data compression unit to acquire a plurality of first compensation data provided by the source driving circuit and the common parameter stored in the first storage unit, and to generate a plurality of second compression data based on the plurality of first compensation data and the common parameter; using the third storage unit to store the second compression data; and using the data decompression unit to acquire the second compensation data in the third storage unit, so as to compensate the output grayscale in real time.

In an exemplary embodiment of the present disclosure, the driving method further includes storing a plurality of the second compensation data in a second storage unit and, in response to the display panel being powered on, storing, into the third storage unit, a plurality of the second compensation data stored in the second storage unit.

The display panel driving method has been described in detail in the above content, and will not be repeated here.

Figure 4:
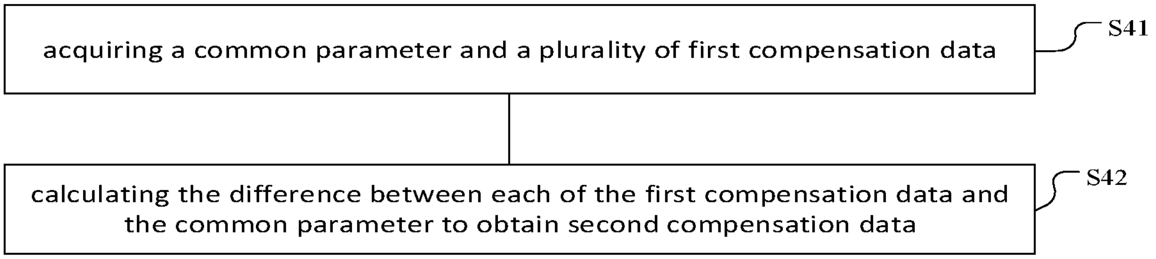
FIG. 4 is a flowchart of a compensation data compression method for a display panel according to an exemplary embodiment of the present disclosure.

An exemplary embodiment of the present disclosure also provides a compensation data compression method for a display panel, as shown in FIG. 4, which is a flowchart showing the compensation data compression method for a display panel according to an exemplary embodiment of the present disclosure. The compensation data compression method for a display panel may include the following steps S41-S42.

In step S41, a common parameter and a plurality of first compensation data are acquired.

In step S42, the difference between each of the first compensation data and the common parameter is calculated to obtain second compensation data.

The bit width of the second compensation data is smaller than the bit width of the first compensation data.

In the compensation data compression method for a display panel provided by an exemplary embodiment of the present disclosure, the difference between each of the first compensation data and the respective second compensation data is equal to the common parameter. That is, when compressing any of the first compensation data, the common parameter may be subtracted from the first compensation data to obtain the second compensation data. On the one hand, in the mass production of the display panels applying this data compression method, the data compression methods for different display panels may use the same common parameter, thus avoiding the data analysis of the display panels. On the other hand, data analysis is not required for the display panels applying this compression method to obtain the common parameter. On the still another hand, the compression method may be implemented purely by hardware, thus avoiding the setting of programmable circuits, and thereby reducing the cost of the display panel.

In an exemplary embodiment, the bit width of each of the first compensation data is the same, and the bit width of each of the second compensation data is the same.

In an exemplary embodiment, the display panel includes a driving transistor, and the first compensation data includes any one of threshold compensation data and mobility compensation data of the driving transistor.

In an exemplary embodiment, the first compensation data comprises the mobility compensation data.

Figure 5:
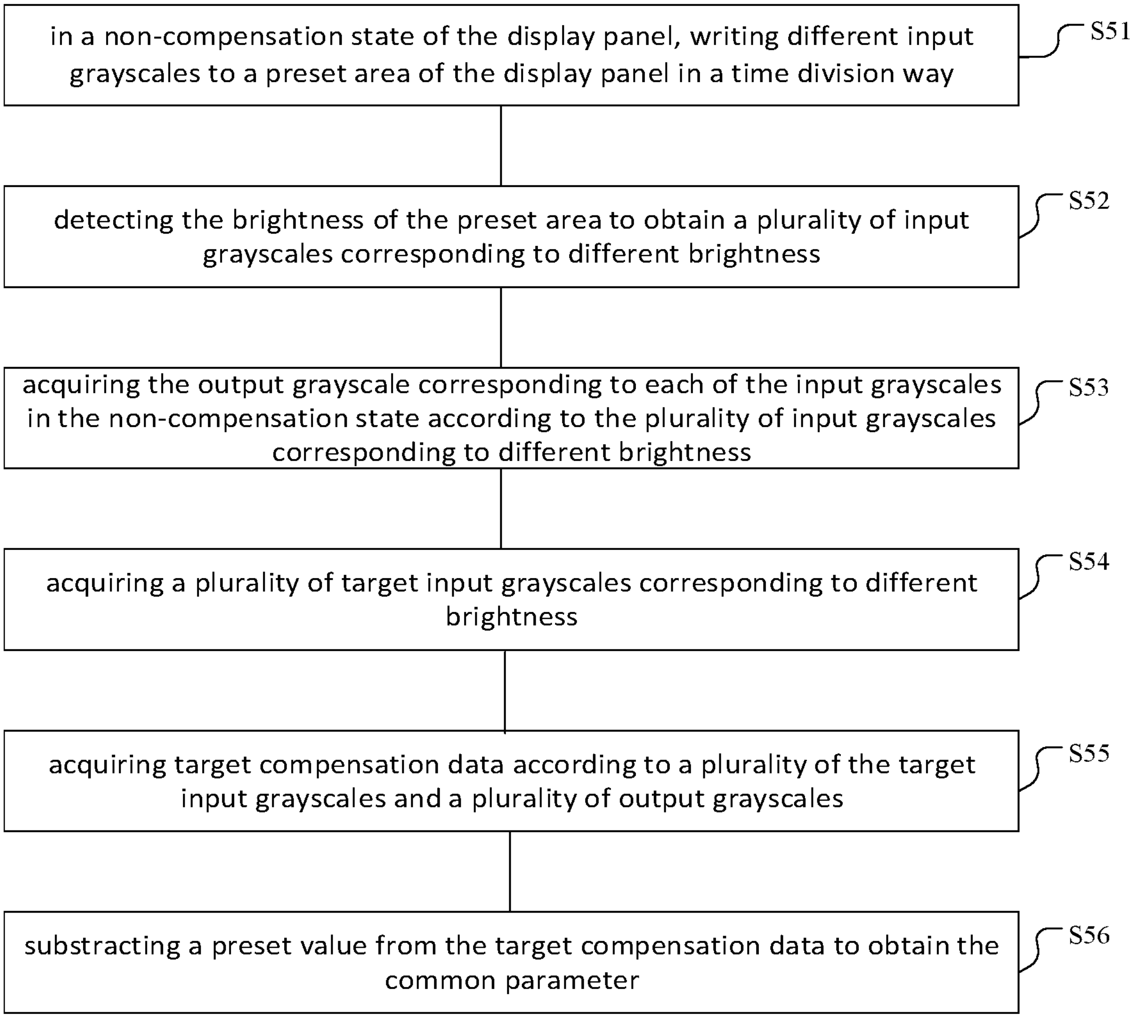
FIG. 5 is a flowchart of a method for acquiring a common parameter in a compensation data compression method for a display panel according to an exemplary embodiment of the present disclosure.

In an exemplary embodiment, as shown in FIG. 5, a flowchart is illustrated showing a method for obtaining a common parameter in a compensation data compression method for a display panel according to an exemplary embodiment of the present disclosure. The common parameter is obtained by a preset detection method, and the preset detection method may include the following steps S51-S56.

In step S51, in a non-compensation state of the display panel, different input grayscales is written to a preset area of the display panel in a time division way.

In step S52, the brightness of the preset area is detected to obtain a plurality of input grayscales corresponding to different brightness.

In step S53, the output grayscale corresponding to each of the input grayscales in the non-compensation state is acquired according to the plurality of input grayscales corresponding to different brightness.

In step S54, a plurality of target input grayscales corresponding to different brightness is acquired.

In step S55, target compensation data is acquired according to a plurality of the target input grayscales and a plurality of output grayscales.

In step S56, a preset value is subtracted from the target compensation data to obtain the common parameter.

In an exemplary embodiment of the present disclosure, the preset area is located in a central area of the display panel.

In an exemplary embodiment of the present disclosure, the output grayscale $GL_{out}=a(GL_{in}/GL_{max})^x+b$, where $GL_{in}$ is the input grayscale, a is the mobility compensation data, b is the threshold compensation data, X is the Gamma value correlated quantity, and $GL_{max}$ is the maximum grayscale of the display panel.

Acquisition of the plurality of input grayscales corresponding to different brightness includes acquiring a first input grayscale corresponding to a first brightness value, and a second input grayscale corresponding to a second brightness value.

Acquisition of the plurality of target input grayscales corresponding to different brightness includes acquiring a first target input grayscale corresponding to the first brightness value and a second target input grayscale corresponding to the second brightness value.

In an exemplary embodiment of the present disclosure, acquisition of the output grayscale corresponding to each of the input grayscales in non-compensation state according to the plurality of input grayscales corresponding to different brightness includes: acquiring a first output grayscale corresponding to the first input grayscale, and a second output grayscale corresponding to the second input grayscale, according to the formula of $GL_{out}=a(GL_{in}/GL_{max})^x+b$, where b=0, and the value of a is equal to the maximum grayscale value of the display panel.

In an exemplary embodiment of the present disclosure, the first brightness value is zero, and the second brightness value is the maximum brightness of the display panel. Acquisition of the first input grayscale corresponding to the first brightness value and the second input grayscale corresponding to the second brightness value includes gradually increasing the input grayscale according to a preset interval; acquiring the input grayscale when the brightness of the display panel changes from zero to non-zero as the first input grayscale, and acquiring the input grayscale, when the brightness of the display panel is the maximum brightness, the second input grayscale.

In an exemplary embodiment of the present disclosure, the first target input grayscale corresponding to the first brightness value is 0, and the second target grayscale corresponding to the second brightness value is the maximum grayscale of the display panel.

In an exemplary embodiment of the present disclosure, acquisition of the target compensation data according to the plurality of the target input grayscales and the plurality of output grayscales includes: calculating the target compensation data a1 according to the formula of $a1=(GL1-GL2)GL_{max}^x/(GL_{ob1}^x-GL_{ob2}^x)$, where GL1 is the first output grayscale, GL2 is the second output grayscale, $GL_{max}$ is the maximum grayscale of the display panel, $GL_{ob1}$ is the first target input grayscale, and $GL_{ob2}$ is the second target input grayscale.

In an exemplary embodiment of the present disclosure, the bit width of the first compensation data is 10 bits, the bit width of the second compensation data is 9 bits, and the preset value is 128-256. For example, the preset value may be 128, 150, 200, 250, or 256.

The compensation data compression method has been described in detail in the above content, and will not be repeated here.

An exemplary embodiment of the present disclosure also provides a compensation data decompression method for a display panel, configured for decompressing the second compensation data compressed by the foregoing compensation data compression method for a display panel.

The decompression method includes acquiring a common parameter and a plurality of second compensation data, and calculating the sum value of each of the second compensation data and the common parameter to obtain first compensation data, where the bit width of the second compensation data is smaller than the bit width of the first compensation data.

Other embodiments of the present disclosure will be readily apparent to those skilled in the art upon consideration of the present specification and practice of what is disclosed herein. The present application is intended to cover any variations, uses, or adaptations of the present disclosure that follow the general principle of the present disclosure and include common knowledge or techniques in the technical field not disclosed by the present disclosure. The specification and examples are to be regarded as exemplary only, with the true scope and spirit of the present disclosure being indicated by the claims.

It is to be understood that the present disclosure is not limited to the precise structures described above and illustrated in the accompanying drawings, and that various modifications and changes may be made without departing from the scope thereof. The scope of the present disclosure is limited only by the appended claims.

The invention claimed is:

1. A display panel, comprising:

a data compression unit configured to acquire a plurality of first compensation data and a common parameter, and further configured to compress each of the first compensation data into second compensation data according to a preset compression rule based on the first compensation data and the common parameter; and a data decompression unit configured to acquire a plurality of the second compensation data and the common parameter, and further configured to decompress each of the second compensation data into the first compensation data according to a preset decompression rule based on the second compensation data and the common parameter, wherein:

a bit width of the second compensation data is smaller than a bit width of the respective first compensation data; and a difference between each of the first compensation data and the respective second compensation data is equal to the common parameter, wherein the display panel comprises a driving transistor, and the first compensation data comprises mobility compensation data of the driving transistor; and wherein the common parameter is acquired by a preset detection method, and the preset detection method comprises:

writing, in a non-compensation state of the display panel, different input grayscales into a preset area of the display panel in a time-division way;

detecting a brightness of the preset area to obtain a plurality of input grayscales corresponding to different brightness;

acquiring an output grayscale corresponding to each of the input grayscales in the non-compensation state, according to the plurality of input grayscales corresponding to different brightness;

acquiring a plurality of target input grayscales corresponding to different brightness;

acquiring target compensation data according to the plurality of target input grayscales and a plurality of output grayscales; and subtracting a preset value from the target compensation data to obtain the common parameter.

2. The display panel according to claim 1, wherein the bit width of each of the first compensation data is equal, and the bit width of each of the second compensation data is equal.

3. The display panel according to claim 1, wherein the preset decompression rule comprises: acquiring a sum value of the second compensation data and the common parameter to obtain the first compensation data.

4. The display panel according to claim 1, wherein the preset area is located in a central area of the display panel.

5. The display panel according to claim 1, wherein:

the output grayscale GLout is expressed by a formula of GLout=a(GLin/GLmax)x+b, where GLin is the input grayscale, a is the mobility compensation data, b is the threshold compensation data, X is a gamma value correlated quantity, and GLmax is the maximum grayscale of the display panel;

the acquiring of the plurality of input grayscales corresponding to different brightness, comprises acquiring a first input grayscale corresponding to a first brightness value and a second input grayscale corresponding to a second brightness value; and the acquiring of the plurality of target input grayscales corresponding to different brightness, comprises acquiring a first target input grayscale corresponding to the first brightness value and a second target input grayscale corresponding to the second brightness value.

6. The display panel according to claim 5, wherein, the acquiring of the output grayscale corresponding to each of the input grayscales in the non-compensation state according to the plurality of input grayscales corresponding to different brightness, comprises:

acquiring a first output grayscale corresponding to the first input grayscale and a second output grayscale corresponding to the second input grayscale, according to a formula of GLout=a(GLin/GLmax)x+b, where b=0, and a has a value equal to the maximum grayscale value of the display panel.

7. The display panel according to claim 6, wherein:

the first brightness value is zero, and the second brightness value is the maximum brightness of the display panel; and the acquiring of the first input grayscale corresponding to the first brightness value and the second input grayscale corresponding to the second brightness value, comprises:

gradually increasing the input grayscale according to a preset interval;

acquiring the input grayscale, when the brightness of the display panel changes from zero to non-zero, as the first input grayscale; and acquiring the input grayscale, when the brightness of the display panel is the maximum brightness, as the second input grayscale.

8. The display panel according to claim 7, wherein:

the first target input grayscale corresponding to the first brightness value is 0; and the second target grayscale corresponding to the second brightness value is the maximum grayscale of the display panel.

9. The display panel according to claim 6, wherein, the acquiring of the target compensation data according to the plurality of target input grayscales and the plurality of output grayscales, comprises:

calculating the target compensation data a1 according to a formula of a1=(GL1−GL2)GLmaxx/(GLob1x−GLob2x), where GL1 is the first output grayscale, GL2 is the second output grayscale, GLmax is the maximum grayscale of the display panel, GLob1 is the first target input grayscale, and GLob2 is the second target input grayscale.

10. The display panel according to claim 1, wherein the bit width of the first compensation data is 10 bits, the bit width of the second compensation data is 9 bits, and the preset value is in a range of 128-256.

11. The display panel according to claim 1, wherein the display panel further comprises:

a source driving circuit connected to the data compression unit configured to provide a plurality of the first compensation data;

a first storage unit connected to the data compression unit configured to store the common parameter;

a second storage unit connected to the data compression unit configured to store the second compensation data when powered off and powered on; and a third storage unit connected to the data compression unit and the data decompression unit configured to store the second compensation data when powered on.

12. The display panel according to claim 11, wherein:

the first storage unit comprises an electrically erasable programmable read-only memory (EEPROM);

the second storage unit comprises a flash memory; and the third storage unit comprises a double rate synchronous dynamic random access memory (DDR).

13. The display panel according to claim 1, wherein the compression rule comprises: acquiring a difference between the first compensation data and the common parameter to obtain the second compensation data.

14. A display panel driving method for driving a display panel, comprising:

providing the display panel, wherein the display panel comprises:

a data compression unit configured to acquire a plurality of first compensation data and a common parameter, and further configured to compress each of the first compensation data into second compensation data according to a preset compression rule based on the first compensation data and the common parameter;

a data decompression unit configured to acquire a plurality of the second compensation data and the common parameter, and further configured to decompress each of the second compensation data into the first compensation data according to a preset decompression rule based on the second compensation data and the common parameter;

a source driving circuit connected to the data compression unit configured to provide a plurality of the first compensation data;

a first storage unit connected to the data compression unit configured to store the common parameter;

a second storage unit connected to the data compression unit configured to store the second compensation data when powered off and powered on; and a third storage unit connected to the data compression unit and the data decompression unit configured to store the second compensation data when powered on, wherein a bit width of the second compensation data is smaller than a bit width of the respective first compensation data, and a difference between each of the first compensation data and the respective second compensation data is equal to the common parameter;

acquiring, by the data compression unit, the plurality of first compensation data provided by the source driving circuit and the common parameter stored in the first storage unit, and generating, by the data compression unit, a plurality of second compression data based on the plurality of first compensation data and the common parameter;

storing, by the third storage unit, the second compression data; and acquiring, by the data decompression unit, the second compensation data in the third storage unit to compensate the output grayscale in real time, wherein the display panel comprises a driving transistor, and the first compensation data comprises mobility compensation data of the driving transistor; and wherein the common parameter is acquired by a preset detection method, and the preset detection method comprises:

writing, in a non-compensation state of the display panel, different input grayscales into a preset area of the display panel in a time-division way;

detecting a brightness of the preset area to obtain a plurality of input grayscales corresponding to different brightness;

acquiring an output grayscale corresponding to each of the input grayscales in the non-compensation state, according to the plurality of input grayscales corresponding to different brightness;

acquiring a plurality of target input grayscales corresponding to different brightness;

acquiring target compensation data according to the plurality of target input grayscales and a plurality of output grayscales; and subtracting a preset value from the target compensation data to obtain the common parameter.

15. The display panel driving method according to claim 14, further comprising:

storing a plurality of the second compensation data into a second storage unit; and in response to the display panel being powered on, storing, into the third storage unit, the plurality of the second compensation data stored in the second storage unit.

16. A compensation data compression method for a display panel, comprising:

acquiring a common parameter and a plurality of first compensation data; and calculating a difference value between each of the first compensation data and the common parameter to obtain second compensation data, wherein, a bit width of the second compensation data is smaller than a bit width of the first compensation data, wherein the display panel comprises a driving transistor, and the first compensation data comprises mobility compensation data of the driving transistor; and wherein the common parameter is acquired by a preset detection method, and the preset detection method comprises:

writing, in a non-compensation state of the display panel, different input grayscales into a preset area of the display panel in a time-division way;

detecting a brightness of the preset area to obtain a plurality of input grayscales corresponding to different brightness;

acquiring an output grayscale corresponding to each of the input grayscales in the non-compensation state, according to the plurality of input grayscales corresponding to different brightness;

acquiring a plurality of target input grayscales corresponding to different brightness;

acquiring target compensation data according to the plurality of target input grayscales and a plurality of output grayscales; and subtracting a preset value from the target compensation data to obtain the common parameter.

17. A compensation data decompression method for a display panel for decompressing the second compensation data compressed by the compensation data compression method for a display panel according to claim 16, and comprising:

acquiring a common parameter and a plurality of second compensation data; and calculating a sum value of each of the second compensation data and the common parameter to obtain first compensation data, wherein, a bit width of the second compensation data is smaller than a bit width of the first compensation data.

* * * * *